United States Patent
Kinnear

[11] Patent Number: 6,122,854
[45] Date of Patent: Sep. 26, 2000

[54] CONTROLLED MOVEMENT FISHING LURE

[76] Inventor: Duane Wesley Kinnear, R.D. #1, 11770 Ridge Rd., East Springfield, Pa. 19118

[21] Appl. No.: 09/245,093

[22] Filed: Jan. 8, 1999

[51] Int. Cl.[7] .................................................. A01K 85/00
[52] U.S. Cl. ........................ 43/42.02; 43/42.03; 43/42.22
[58] Field of Search ............................... 43/42.02, 42.03, 43/42.39, 42.22

[56] References Cited

U.S. PATENT DOCUMENTS

| | | | |
|---|---|---|---|
| 941,911 | 11/1909 | Burthe | 43/42.02 |
| 1,068,908 | 7/1913 | Lane | 43/42.03 |
| 1,393,617 | 10/1921 | Frame | 43/42.02 |
| 1,538,658 | 5/1925 | Rindt | 43/42.02 |
| 1,694,195 | 12/1928 | Watts | 43/42.03 |
| 1,758,160 | 5/1930 | Lee | 43/42.02 |
| 2,221,381 | 11/1940 | Hosmer | 43/42.02 |
| 2,365,628 | 12/1944 | Dory | 43/42.02 |
| 2,448,523 | 9/1948 | Fibiger | 43/42.02 |
| 2,472,639 | 6/1949 | Wickens | 43/42.2 |
| 2,519,236 | 8/1950 | Dudley | 43/42.02 |
| 2,594,981 | 4/1952 | Ohlund et al. | 43/42.02 |
| 2,741,056 | 4/1956 | Sullivan et al. | 43/42.02 |
| 2,763,085 | 9/1956 | Caillier | 43/42.03 |
| 2,789,386 | 4/1957 | Creelman | 43/42.02 |
| 2,794,287 | 6/1957 | Mancusi, Jr. | 43/42.02 |
| 2,867,933 | 1/1959 | Stookey | 43/42.02 |
| 2,883,787 | 4/1959 | Dahl | 43/42.02 |
| 3,001,315 | 9/1961 | Zimmerman | 43/42.03 |
| 3,032,910 | 5/1962 | Crossan | 43/42.03 |
| 3,196,574 | 7/1965 | Weimer | 43/42.02 |
| 3,404,565 | 10/1968 | Barry et al. | 43/42.02 |
| 3,457,667 | 7/1969 | Tripp | 43/42.02 |
| 3,626,628 | 12/1971 | Weimer | 43/42.02 |
| 3,815,275 | 6/1974 | Amundson | 43/42.22 |
| 3,858,344 | 1/1975 | Watts | 43/42.05 |
| 4,569,147 | 2/1986 | Margulis | 43/26.2 |
| 4,581,841 | 4/1986 | Gish | 43/26.2 |
| 4,674,223 | 6/1987 | Pearce | 43/26.2 |
| 4,831,767 | 5/1989 | Pearce | 43/26.2 |
| 4,980,987 | 1/1991 | Ramsey, Sr. | 43/42.02 |
| 5,035,075 | 7/1991 | Pearce | 43/26.2 |
| 5,088,227 | 2/1992 | Toner et al. | 43/42.3 |
| 5,189,825 | 3/1993 | Stewart | 43/42.03 |
| 5,255,467 | 10/1993 | Haskell | 43/43.13 |
| 5,329,721 | 7/1994 | Smith | 43/42.22 |
| 5,787,633 | 8/1998 | Taylor | 43/42.02 |

FOREIGN PATENT DOCUMENTS

| | | | |
|---|---|---|---|
| 555845 | 4/1958 | Canada | 43/42.02 |
| 562247 | 8/1958 | Canada | 43/42.02 |
| 605711 | 9/1960 | Canada | 43/42.02 |
| 697376 | 11/1964 | Canada | 43/42.03 |
| 97713 | 12/1939 | Sweden | 43/42.03 |
| 119879 | 10/1947 | Sweden | 43/42.03 |
| 22354 | 2/1906 | United Kingdom | 43/42.02 |

*Primary Examiner*—Michael J. Carone
*Assistant Examiner*—Fredrick T. French, III

[57] ABSTRACT

A fishing lure whose direction of travel is controllable which includes a main body with hooks attached. The fishing line attaches to the lure through an eyelet connected to an activator shaft. When the fishing line is jerked by the user the activator shaft contacts a plunger button in a dual-position click mechanism, changing it from one position to the other. The change in position is transmitted from the click mechanism through a protruder shaft to a pivot plate. A shaft which serves as the fulcrum of the pivot plate extends through the main body of the lure and is there attached to a steering lip. The steering lip controls the direction of travel of the lure, allowing the user to vary the direction of travel by repeated jerks on the line.

2 Claims, 7 Drawing Sheets

CONTROLLED MOVEMENT FISHING LURE

BACKGROUND OF THE INVENTION (a) Field of the Invention

This invention relates to a fishing lure whose directional movement can be controlled by the user tugging or jerking on the fishing line.

(b) Description of the Prior Art

Sport fishing has been a popular pastime for many years. The use of artificial lures to attract fish as opposed to natural bait, is well known in the prior art. A great variety of lures have been employed, including flies, rubber worms, spoons, spinners, plugs and minnow-like devices. It has long been recognized that it is desirable to use a lure which moves or oscillates in some manner as it is pulled through the water by the fishing line so as to enhance the possibility that it will attract the targeted fish.

The present invention relates to an artificial fishing lure whose movement is controlled by means of a steering lip or rudder attached to the main body of the lure in a hinged relationship which allows the steering lip to be moved by the user into one of two positions. Each of the positions will cause the lure to move in a certain direction as it is being retrieved. A principal feature of the present invention is that the fisherman can control the positioning of the rudder by a tug or jerk on the fishing line, thereby allowing the fisherman a high level of control over the movement of the lure through the water.

There have been previous patents granted for fishing lures which show some feature of movement. For instance, U.S. Pat. No. 4,581,841 to Gish discloses a fishing lure with an internal longitudinal crankshaft assembly connecting to a rear tail assembly, and an optional transverse interior rod mechanism terminating in simulated fins along the sides of the lure. Repeated jerks or pulls on the fishing line are transmitted to the longitudinal member, and the transverse member if present, resulting in simulated tail and fin movements mimicking a swimming fish.

U.S. Pat. No. 5,080,227 to Toner et al discloses a frog-like lure with an internal rod, spring, and hinge mechanism that causes the legs of the lure to oscillate in a manner which mimics a swimming frog as the lure is pulled through the water by a fishing line.

U.S. Pat. No. 5,787,633 to Taylor discloses a ballistic fishing lure which features a jumping motion in which the lure can be impelled to jump out of the water by energy stored within the lure as it is dragged through the water. The jumping motion is accomplished by means of a coil spring and sliding tube arrangement.

Yet another type of moveable fishing lure is disclosed in U.S. Pat. Nos. 4,674,223 and 4,831,767 to Pearce. These patents show a lure with an internal wind-up mechanism attached through means of a drive linkage to propulsion structures, such as legs or fins, which extend externally from the main body of the lure. When the fishing line is pulled, energy is stored in the wind-up mechanism. Upon release of the line, this stored energy is released, causing oscillating motion in the propulsion structures.

Each of the movable fishing lures heretofore proposed lacks the feature of being directionally controllable by the user. Although the prior art lures provide control features which allow the user to start and stop the swimming or jumping motion of the lure, none offers effective control of the direction of travel of the lure. The prior art lures provide only for straight-line or random motion. As such, there is a need for a lure which is directionally controllable by the user.

SUMMARY OF THE INVENTION

The present invention is a directionally controllable fishing lure which allows the user to easily control the path which the lure will follow in being retrieved after having been cast. The invention comprises a main body with a dual-position hinged steering lip. The main body, which in the preferred embodiment is minnow-shaped, includes an internal mechanism which links to the steering lip. By means of the fishing line, the user is able to control the internal mechanism at will and move the position of the steering lip from one side to the other. The change in positioning of the steering lip will then cause a corresponding change in the direction the lure travels through the water as it is being retrieved.

It is believed that the invention offers a number of advantages. Heretofore, a fisherman at point A who casts a lure to point B has been limited to a retrieval by which the lure essentially will follow the path of line AB, perhaps with some slight oscillation. The user is able to control the rate of return by varying the cranking speed, and in some of the prior art previously cited is able to control when swimming and jumping action will be displayed by the lure during the retrieval, but the path of travel is generally a straight line or perhaps a fixed curve, depending upon the shape of the lure. The present invention will allow the user to consciously select the path the lure will follow. Thus, the user becomes a more active participant, heightening the enjoyment of the sport.

It is therefore an object of the present invention to provide a new type of fishing lure which is directionally controllable by the user. It is another object of the invention to provide a directionally controllable lure which accomplishes this control through simple mechanical means which will allow for the lure to be manufactured inexpensively.

It is yet a further object of the present invention to provide such a lure which can, in its external appearance, take the form of any number of common or conventional lures currently available.

DESCRIPTION OF THE PREFERRED EMBODIMENT

Figure 1:
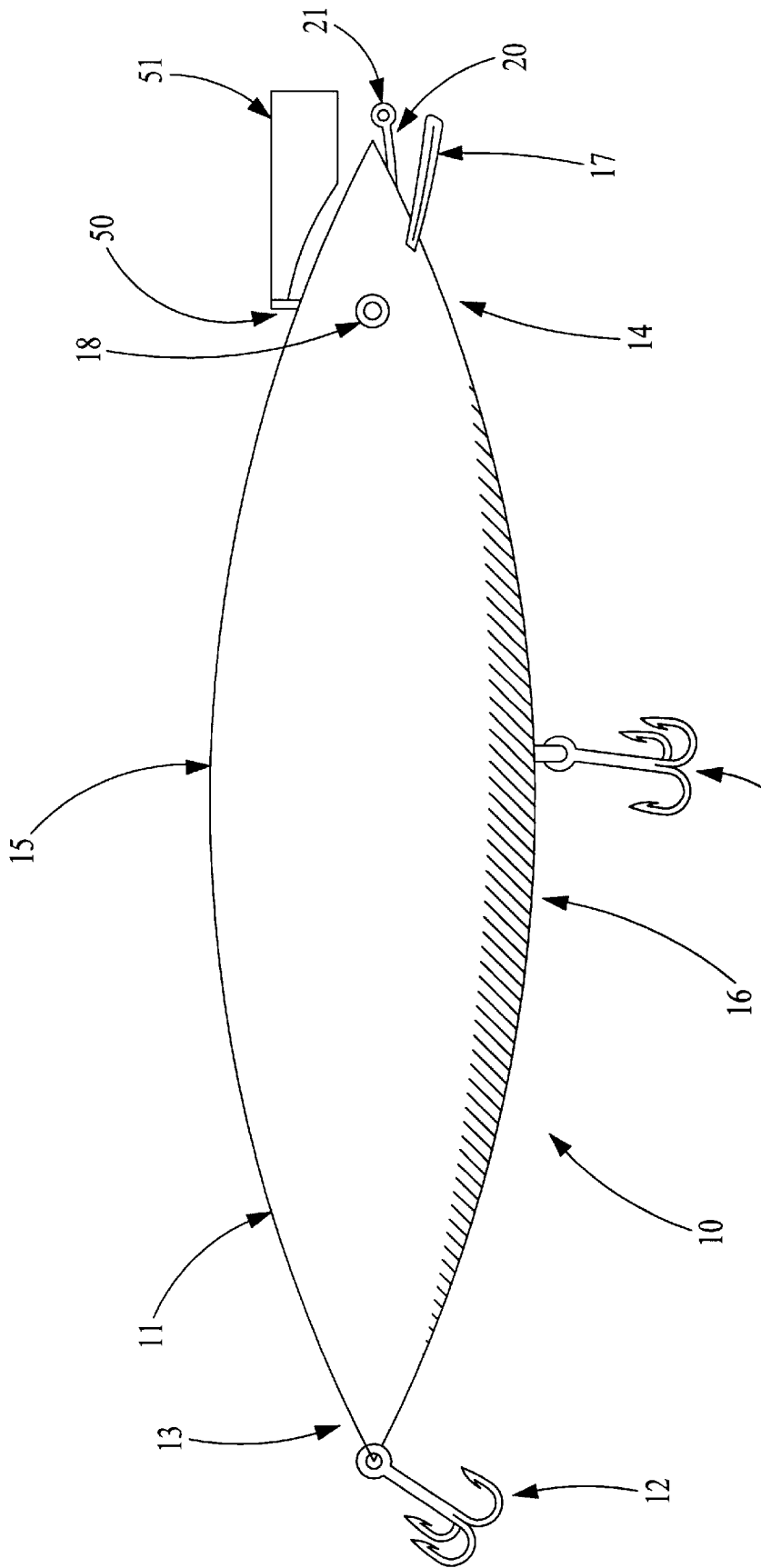
FIG. 1 is a side view of the invention.

Referring to the drawings, specifically first to FIG. 1, the controlled movement fishing lure of the invention is generally shown as 10. In the drawing, the invention is shown as minnow-shaped, although other shapes would be possible and acceptable.

The main body 11 of the invention is partially hollow, with inner-workings in the interior cavity to be described below. Attached to the main body 11 are fishing hooks 12 of conventional design. The main body 11 has a back end 13 and a front end 14, as well as a top 15 and a bottom 16. Attached to the front end 14 of the main body 11, either as an integral part, or as a separate mechanically or adhesively attached piece, is a diving lip 17. In the embodiment shown, a simulated eye 18 is included in an appropriate location on the main body 11 to help provide the illusion that the invention is a minnow. Simulated fins or a tail are not shown on the drawings, but could easily be added to an embodiment of the invention.

Thus far, what has been described is not different from existing fishing lures. The significant advance represented by the invention will now be discussed. Activator shaft 20 extends from the inside of the main body 11, and out the front end 14. The activator shaft 20 terminates in a fishing line eyelet 21. The fishing line, not shown in the drawings, would be knotted or otherwise attached to the fishing line eyelet 21. A pivot shaft 50 extends from the interior of the main body 11, near the front end 14, and out the top 15. Attached to the pivot shaft 50 is a steering lip 51 or rudder, such that rotation of the pivot shaft 50 results in movement of the steering lip 51, as will be described.

Figure 2:
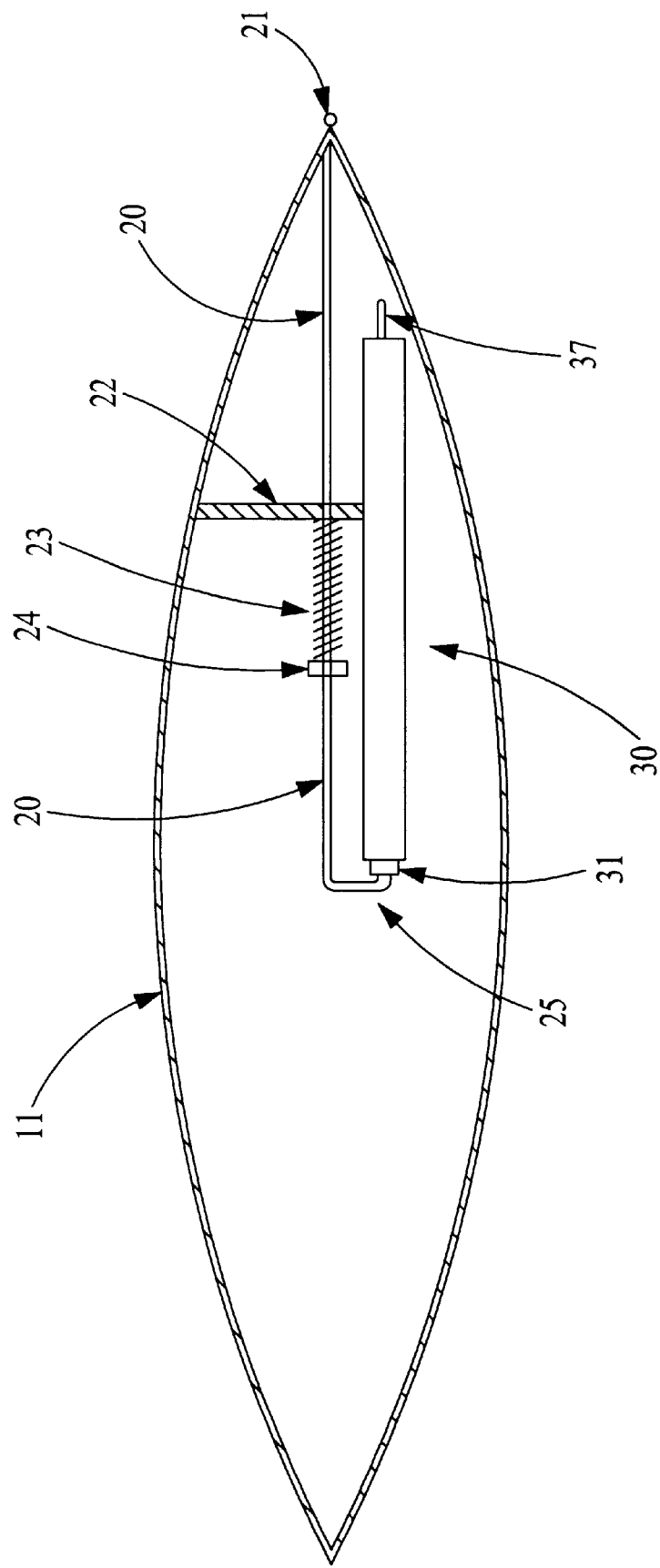
FIG. 2 is a partial side cut-away view of the invention

The internal mechanisms of the invention are best viewed in FIGS. 2–5B. FIG. 2 shows a partial cut-away side view of the invention. As can be seen, activator shaft 20, a rigid rod, extends into the hollow interior of the main body 11. The activator shaft 20 passes through inner shell baffle 22 which helps to stabilize the movement of the activator shaft 20. The activator shaft return spring 23 encircles the activator shaft 20 on the interiormost side of the inner shell baffle 22, and is held in place by activator return spring plate 24. The activator shaft 20 has an interior end 25 which is bent at a 90° angle and contacts plunger button 31.

The plunger button 31 is part of the dual-position click mechanism, shown as 30 in the drawings. The click mechanism 30 is housed in a hollow cylinder 32, best viewed in FIGS. 4A and 4B. As can be seen, the plunger button 31 has a shaft end 33 which can slide within the hollow cylinder 32, and a plate end 34 which provides a bearing surface and functions as a stop to prevent the plunger button 31 from being completely withdrawn from the hollow cylinder 32. The interior walls of the hollow cylinder 32 include a first angled notch 35 and a second angled notch 36. A protruder shaft 37 extends through the wall of the hollow cylinder 32 at the end opposite the plunger button 31, partially within and partially without the hollow cylinder 32, and slidable therein. A protruder return spring 38, is held in place on the protruder shaft 37 by protruder return spring plate 39. Pivotally attached to the end of the protruder shaft 37 within the hollow cylinder 32 is a two-dog chip 40 with a first angled dog 41 and a second angled dog 42.

Figure 5A:
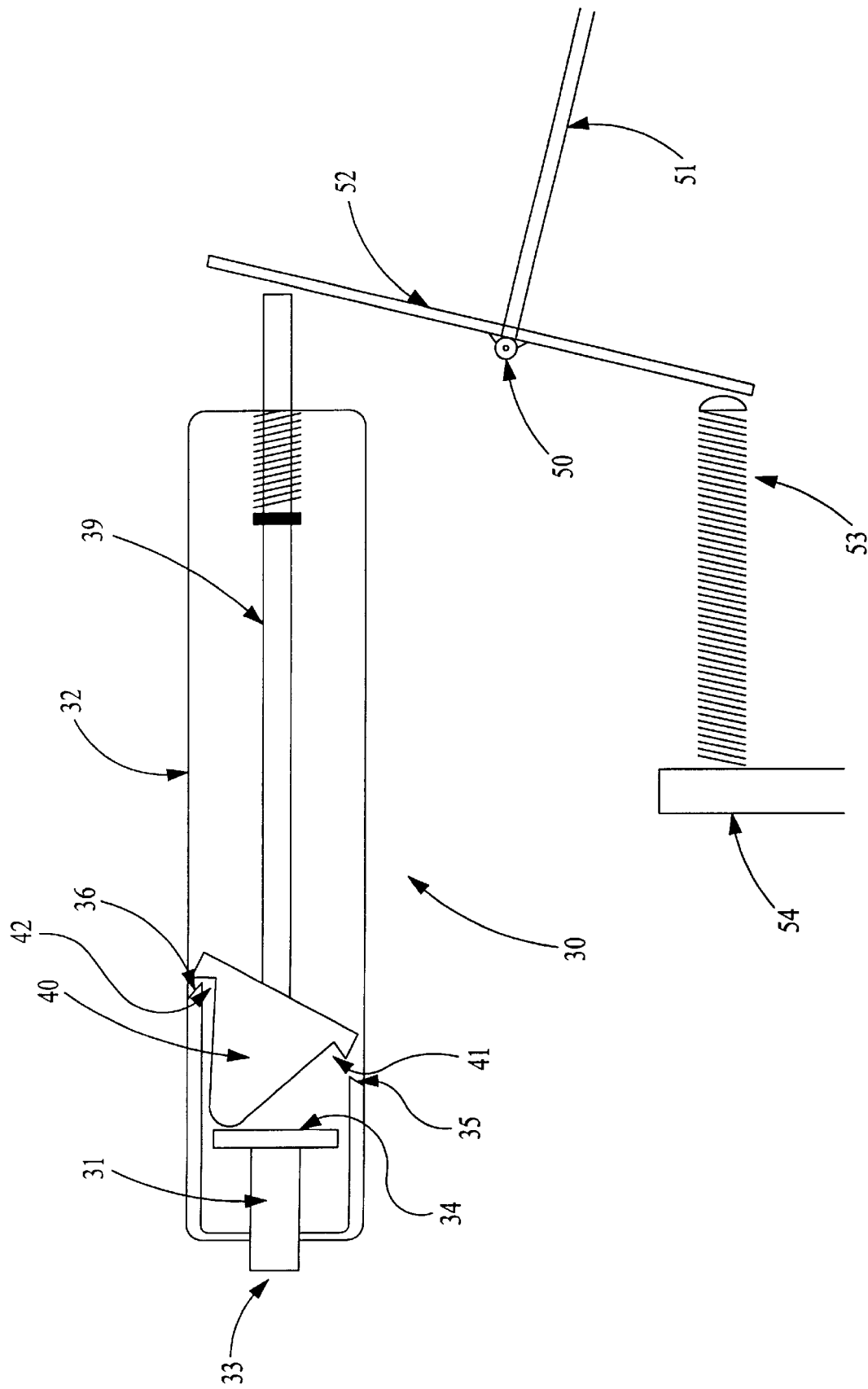
FIGS. 5A and 5B are views of the linkage between the click mechanism and the hinged steering lip of the invention showing the two positions of the click mechanism, extended and retracted.
Figure 5B:
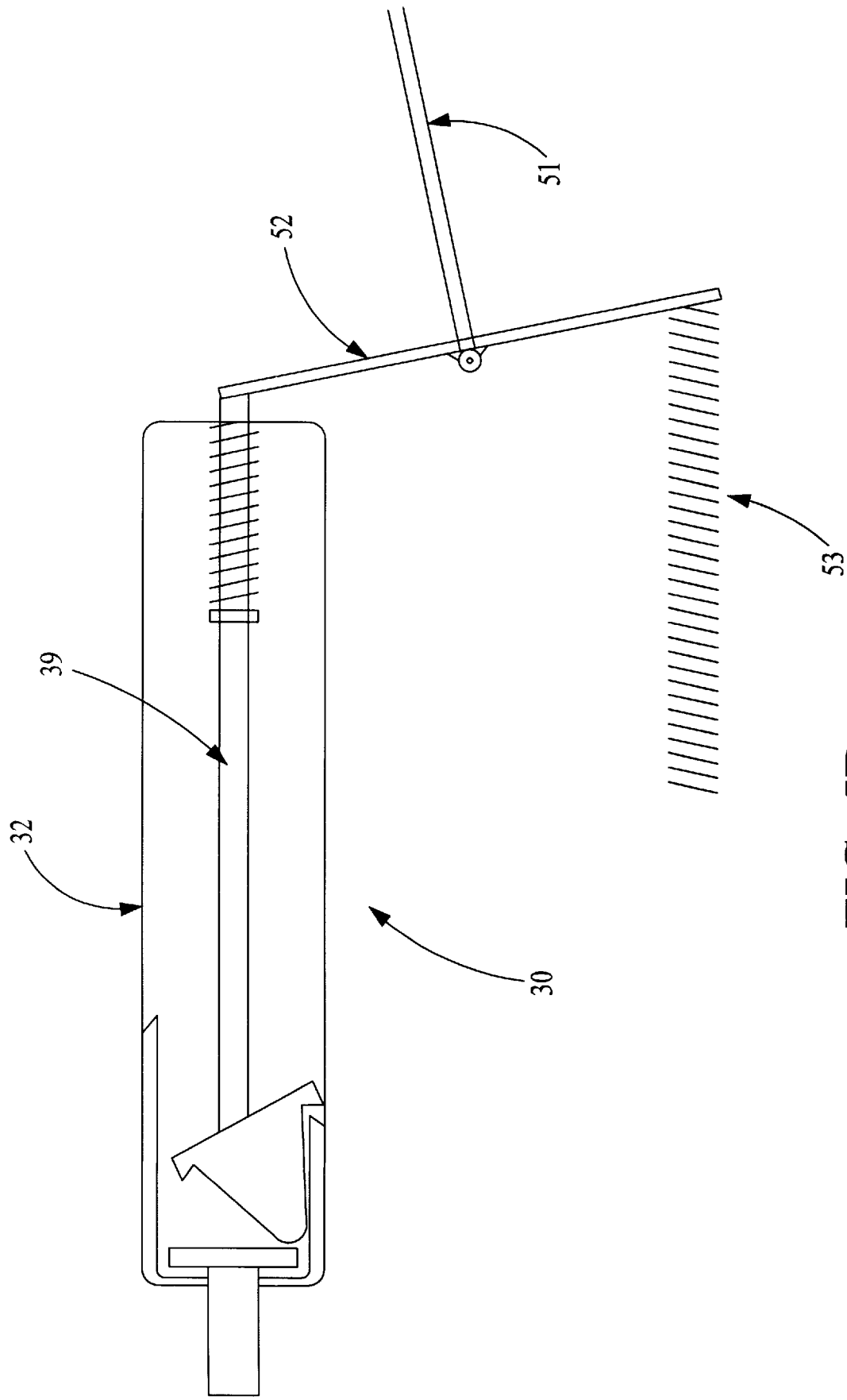

Referring to FIGS. 5A and 5B, the linkage between the click mechanism 30 and the steering lip 51 can now be explained. The end of the protruder shaft 37 outside the hollow cylinder 32 bears against a pivot plate 52, which is attached at a right angle to a fulcrum, pivot shaft 50, viewed from above shaft 50 in the Figures which extends through the top 15 of the main body 11. Steering lip 51 is attached to the portion of the pivot shaft 50 external to the main body 11. Pivot plate 52 is biased by pivot plate position spring 53 which bears against pivot plate 52 at the end opposite the protruder shaft 37. Pivot plate baffle 54 within the hollow of the main body 11 provides a fixed surface to hold position spring 53 in place.

Figure 4A:
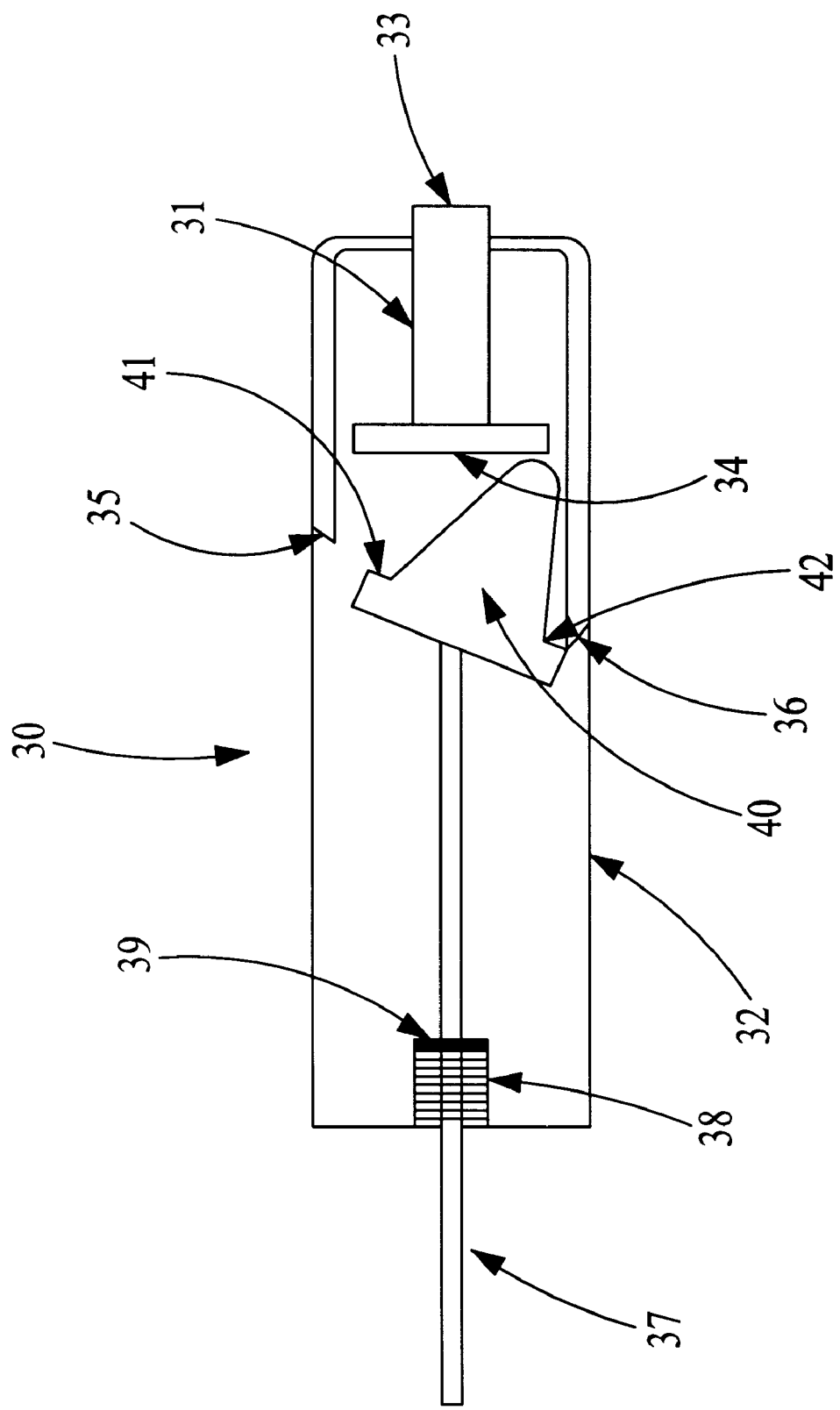
FIGS. 4A and 4B are cut-away views of the click mechanism of the invention showing the two positions, extended and retracted, of the mechanism.
Figure 4B:
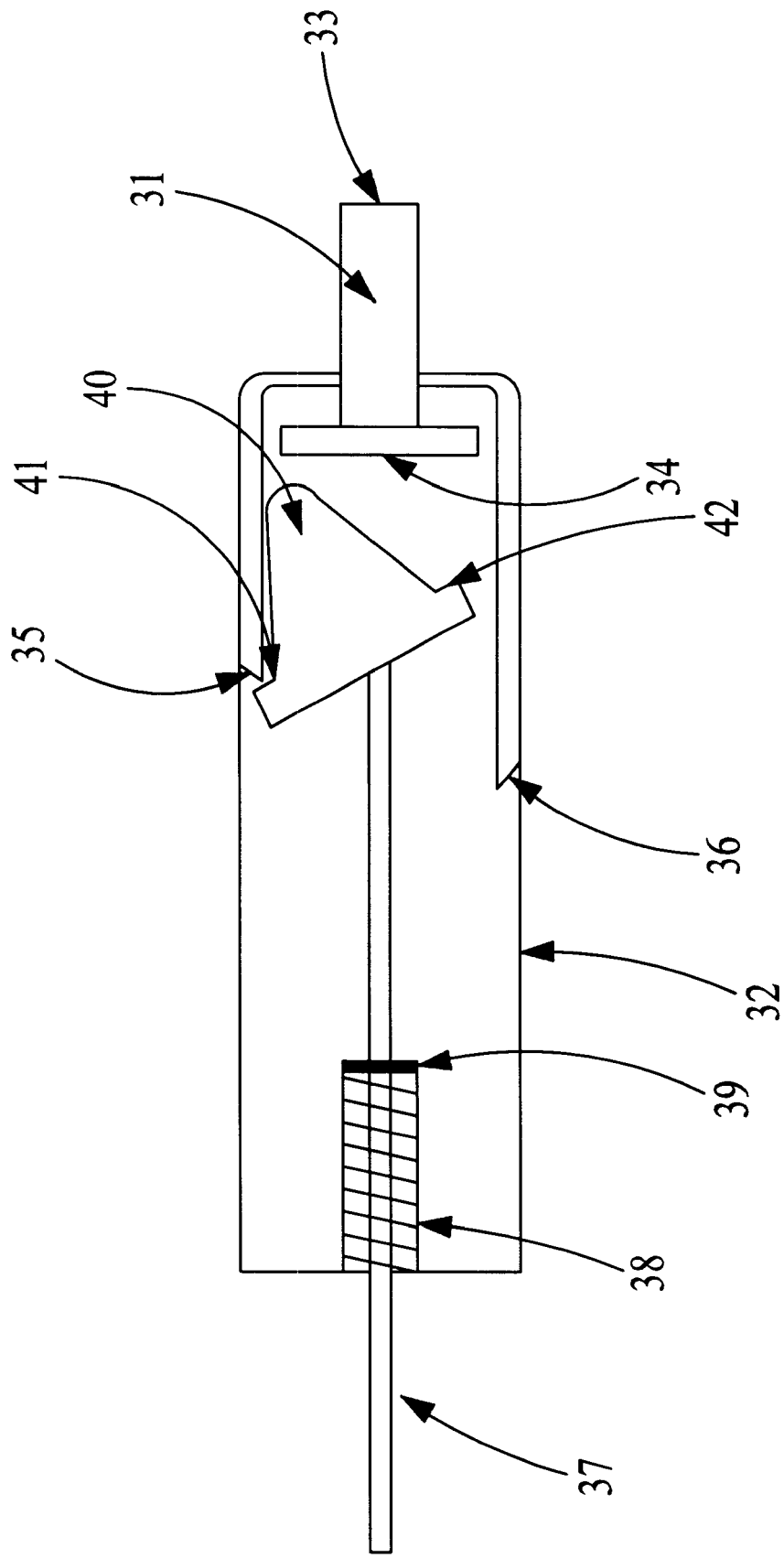

With the various component parts of the invention now having been described, the operation of the invention should be apparent. When the user jerks on the fishing line, the force is transferred through the fishing line eyelet 21 and the activator shaft 20. The activator shaft 20 in turn presses on the plunger button 31, which presses on the two-dog chip 40. As can be seen best in drawings 4A and 4B, the two-dog chip 40 can be in one of two positions, either first angled dog 41 engaged in first angled notch 35, or second angled dog 42 engaged in second angled notch 36. Pressure on the plunger button 31 will result in the two-dog chip 40 moving to the alternate position. For instance, in FIG. 4B, if the fishing line were jerked the force would be transferred through the activator shaft 20 to the plunger button 31, pushing the two-dog chip 40 so that first angled dog 41 becomes disengaged from first angled notch 35. As the pressure is released on the fishing line, activator shaft return spring 23 pushes the activator shaft 20 away from the plunger button 31. The protruder shaft return spring 38 on the protruder shaft 37 pushes on the two-dog chip 40, disengaging it, and by pivoting and sliding action the second angled dog 42, will become engaged with the second angled notch 36, resulting in a change in position. Turning to FIG. 4B, it can readily be seen that by similar sequence, if the click mechanism 30 starts in the position show in that drawing, a jerk on the fishing line will result in movement of the two-dog chip 40 to the other position, i.e., the one shown in FIG. 4A. Thus, repeated pulls on the fishing line will result in alternative positioning of the two-dog chip 40.

Figure 3:
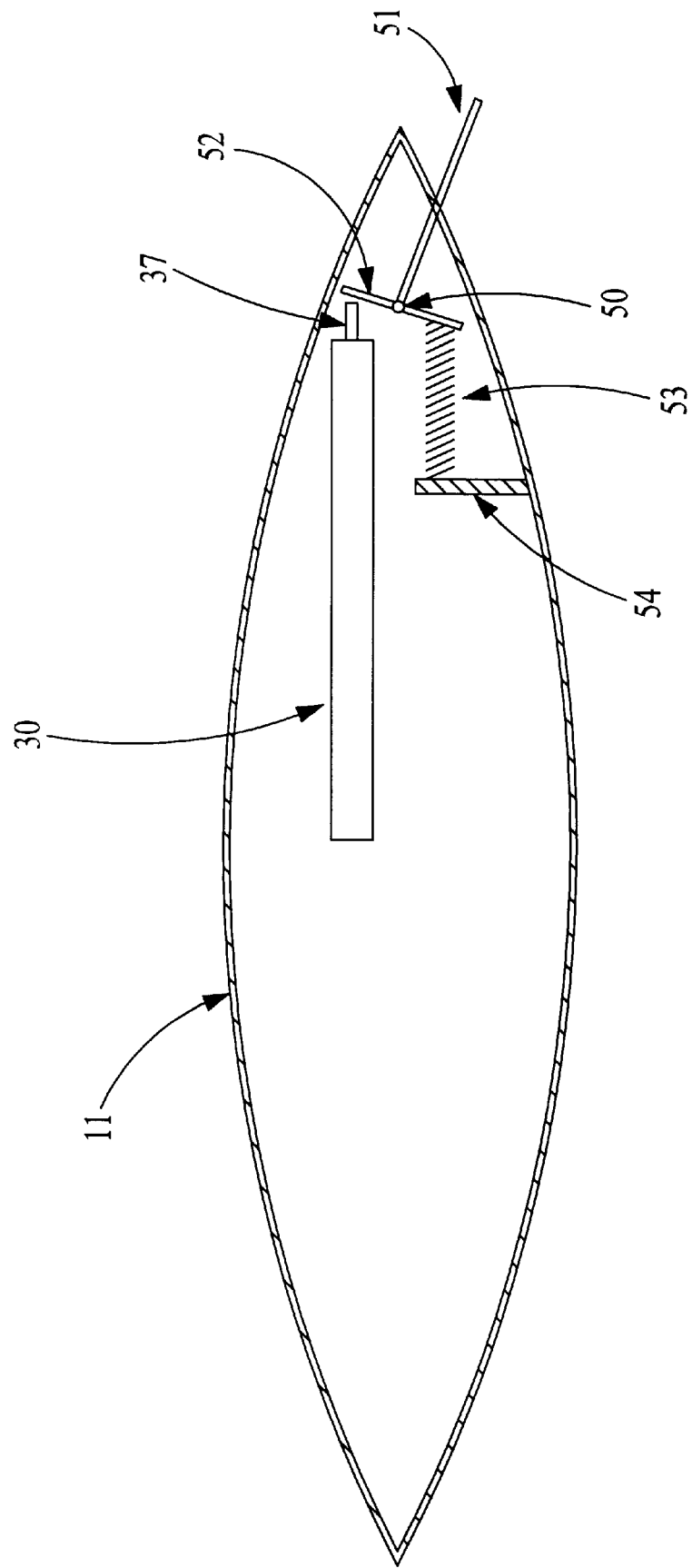
FIG. 3 is a top cut-away view of the invention.

The alternative positioning of the two-dog chip 40 results in alternative positioning of the steering lip 51, as best seen in FIGS. 5A and 5B. FIG. 5A shows the click mechanism 30 in the fully extended position, one in which protruder shaft 37 is maximally extended outside the hollow cylinder 32. This results in the maximum compression of the position spring 53, and displacement of the pivot plate 52 in one extreme position, causing a corresponding positioning of the steering lip 51. FIG. 5B shows the click mechanism 30 in a retracted position; wherein protruder shaft 37 is minimally extended from the hollow cylinder 32. This allows position spring 53 to force pivot plate 52 to the opposite extreme position, resulting in a corresponding change of position in forward steering lip 51. FIG. 3 shows a more comprehensive view of the click mechanism 30, and its linkage with the steering lip 51, within the invention.

Now that the operation of the invention has been described, its actual usage should be obvious. As the lure is retrieved, jerks on the fishing line imparted by the user will cause alternating changes in position in the two-dog chip 40, resulting in a corresponding alternating change in position in the forward steering lip 51. This will cause the lure to change directions in a manner which is highly controllable by the user. It should also be apparent that there are many variables inherent in the invention which can be changed to suit the desired outcome. For instance, the length of travel between the first angled notch 35 and the second angled notch 36 within the click mechanism 30 will determine the difference in the extruded length of the protruder shaft 37 between the extended position and the retracted position. The length of pivot plate 52 will determine the amount of rotational travel in pivot shaft 50 between the two alternate positions. The placement of steering lip 51 on the pivot shaft 50 will determine the positioning of the lip 51 in the two alternative positions. Thus, a lure of the present invention can be configured in many ways. For instance, the two alternative positions allowed by the click mechanism 30 can be made to correspond to directions of hard left/hard right, or slight left/slight right, or straight/right or straight/left or any other combination.

Although the preferred embodiment of the invention has been described in the foregoing detailed description and the accompanying drawings, it should also be understood that the invention is not limited to the embodiment disclosed, but is capable of numerous rearrangements, modifications, and substitutions of parts and elements without departing from the spirit of the invention. The present invention is therefore intended to encompass such modifications and substitutions as fall within the spirit and the scope of the invention.

What is claimed is:

1. A controlled movement fishing lure comprising:
   (a) a generally tubular main body having an internal cavity;
   (b) a steering lip;
   (c) a dual-position click mechanism within the interior cavity of the main body comprising a hollow cylinder including interior cylinder walls, a two-dog chip disposed within the hollow cylinder, two angled notches on the interior cylinder walls corresponding to the two dogs on the two-dog chip, and means for moving the two-dog chip between the angled notches;
   (d) means for linking the dual-position click mechanism to a fishing line; and
   (e) pivot means linking the dual-position click mechanism and the steering lip whereby the steering lip is moved in response to a change of position in the dual-position click mechanism.

2. The fishing lure of claim 1 wherein the pivot means linking the dual-position click mechanism and the steering lip comprises:
   (a) a rotating shaft disposed partially within the internal cavity of the main body and partially outside the main body, with a steering lip fixedly attached to the rotating shaft at a point outside the main body;
   (b) a pivot plate within the internal cavity of the main body, with a first end and a second end, fixedly attached at a point between these two ends to the rotating shaft and rotatable therewith;
   (c) a baffle plate within the internal cavity of the main body;
   (d) a pivot spring extending between the baffle plate and the second end of the pivot plate, said pivot spring contacting both of those parts and providing a positive spring bias between them; and
   (e) said first end of the pivot plate bearing against the dual-position click mechanism, whereby a change in position in the dual-position click mechanism causes partial rotation of the rotating shaft.

* * * * *